United States Patent
Hsu et al.

(10) Patent No.: US 11,900,150 B2
(45) Date of Patent: Feb. 13, 2024

(54) METHODS AND SYSTEMS FOR COLLECTION OF SYSTEM MANAGEMENT INTERRUPT DATA

(71) Applicant: Quanta Computer Inc., Taoyuan (TW)

(72) Inventors: Chih-Hsiang Hsu, Taoyuan (TW); Wei-Wei Li, Taoyuan (TW); Shang-Lin Tsai, Taoyuan (TW); Lueh-Chih Fang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/646,449

(22) Filed: Dec. 29, 2021

(65) Prior Publication Data

US 2023/0205574 A1 Jun. 29, 2023

(51) Int. Cl.
*G06F 13/24* (2006.01)
*G06F 9/48* (2006.01)

(52) U.S. Cl.
CPC ............ *G06F 9/4812* (2013.01); *G06F 13/24* (2013.01)

(58) Field of Classification Search
CPC .............................. G06F 9/4812; G06F 13/24
See application file for complete search history.

(56) References Cited

U.S. PATENT DOCUMENTS

| | | | |
|---|---|---|---|
| 9,158,628 B2 | 10/2015 | Maity et al. | |
| 9,697,008 B2 * | 7/2017 | Schumacher | ....... G06F 11/2284 |
| 11,593,121 B1 * | 2/2023 | Nainar | ................... G06F 21/575 |
| 2005/0204123 A1 * | 9/2005 | Lee | ........................ G06F 9/4405 713/2 |
| 2006/0282589 A1 * | 12/2006 | Ueltschey, III | ......... G06F 13/24 710/260 |
| 2016/0011880 A1 | 1/2016 | Maity et al. | |
| 2016/0378697 A1 * | 12/2016 | Jayakumar | .............. G06F 13/24 710/261 |
| 2019/0004818 A1 | 1/2019 | Wu | |

(Continued)

FOREIGN PATENT DOCUMENTS

| | | | |
|---|---|---|---|
| JP | 2010535384 A | 11/2010 |
| JP | 2016512912 A | 5/2016 |

(Continued)

OTHER PUBLICATIONS

TW Office Action for Application No. 111111785, dated Mar. 17, 2023, w/ First Office Action Summary.

(Continued)

*Primary Examiner* — Henry Tsai
*Assistant Examiner* — Kim T Huynh
(74) *Attorney, Agent, or Firm* — NIXON PEABODY LLP

(57) ABSTRACT

A system and method for storing data associated with a system management interrupt (SMI) in a computer system. Notification of a system management interrupt is received on a central processing unit. The central processing unit enters a system management mode. A system management handler of a basic input output system (BIOS) is executed by a bootstrap processor of the central processing unit. The system management interrupt is initiated via the bootstrap processor. The system management interrupt data is stored in a register of the bootstrap processor. The SMI data is converted to an accessible format. The converted SMI data is stored in a memory.

20 Claims, 6 Drawing Sheets

(56) References Cited

U.S. PATENT DOCUMENTS

| | | | |
|---|---|---|---|
| 2019/0138377 A1* | 5/2019 | Lewis | G06F 21/572 |
| 2021/0081234 A1* | 3/2021 | Liu | G06F 9/4818 |
| 2021/0209052 A1* | 7/2021 | Chen | G06F 11/2038 |
| 2021/0255939 A1* | 8/2021 | Chaiken | G06F 11/0757 |

FOREIGN PATENT DOCUMENTS

| | | |
|---|---|---|
| JP | 2020057257 A | 4/2020 |
| TW | 202147157 A | 12/2021 |

OTHER PUBLICATIONS

TW Search Report for Application No. 111111785, dated Mar. 17, 2023, w/ First Office Action.

JP Office Action for Application No. 2022-102636 dated Sep. 5, 2023, w/ First Office Action Summary, 5 p.

\* cited by examiner

```
{
    "Interrupt" : {
        "Source"  : "Hardware",
        "LastBootInterrupt" :  "No",
        "Timestamp"  :  "06271248",
        "Type"  :  "XHCI SMI"
    }
}
```
310

FIG. 3A

```
{
    "Interrupt" : {
        "Source"  :"Software",
        "LastBootInterrupt" :  "No",
        "Timestamp"  :  "06271248",
        "Type"  :  "FLASH_READ (0x21)"
    }
}
```
320

FIG. 3B

Content of information of SMI

| Interrupt { | Object | (Null) | |
|---|---|---|---|
| Source | String | RO | This property provides the source of interrupt.<br>(Hardware or Software) |
| LastBootInterrupt | Boolean | RO | If the value is true, that means the interrupt is triggered on last boot. |
| Timestamp | String (date-time) | RO | This property shall indicate the time the interrupt occurred. |
| } Type | String | RO | This property shall indicate the interrupt type. |

FIG. 4

METHODS AND SYSTEMS FOR COLLECTION OF SYSTEM MANAGEMENT INTERRUPT DATA

TECHNICAL FIELD

The present disclosure relates generally to operating reliability in computer systems. More particularly, aspects of this disclosure relate to a system that allows the accessible logging of system management interrupt (SMI) data for further analysis.

BACKGROUND

Servers are employed in large numbers for high demand applications, such as network based systems or data centers. The emergence of cloud computing applications has increased the demand for data centers. Data centers have numerous servers that store data and run applications accessed by remotely connected, computer device users. A typical data center has physical rack structures with attendant power and communication connections. Each rack may hold multiple application servers and storage servers. Each server generally includes hardware components such as processors, memory devices, network interface cards, power supplies, and other specialized hardware. Each of the servers generally includes a baseboard management controller that manages the operation of the server and communicates operational data to a central management station that manages the servers of the rack.

A typical server has a processing unit that may have multiple cores for computing operations. The cores run an operating system to communicate with other hardware components in the server. One of the functions of the operating system is to determine errors that indicate a malfunction of a hardware component.

The system management mode (SMM) is a well-known special-purpose operating mode provided for handling system-wide functions such as power management or system hardware control in computer systems. The SMM offers a distinct and easily isolatable processor environment that operates transparently to the operating system, or executive and software applications. The processing unit executes the SMM firmware code in a separate address space that is inaccessible to other operating modes of the processing unit. The SMM can only be entered through a system management interrupt (SMI). Typically, a bootstrap processor (BSP) or core of a computer system performs the SMM.

The SMM is an operating mode of firmware/BIOS to perform system management operations while an operating system (OS) is running. During run time, the CPU chipset detects the configured events and signals an SMI, triggering the CPU to enter SMM by jumping to the SMM entry point. While entering SMM, all cores/threads also enter SMM mode until the bootstrap processor (BSP) finishes the respective SMM service and exits the SMM.

In many processor architectures, the interrupt process is used for reducing the time waiting for requests from memory, interfaces, processors, or peripheral devices. Typically, a system management interrupt (SMI) is triggered through software or hardware. An interrupt handler is executed by firmware as part of the hardware abstraction layer (HAL), which also includes the BIOS. The interrupt handler triggers the SMI. The execution of the operating system is suspended when an SMI interrupt occurs. Data related to the SMI is typically stored in a register such as a Model Specific Register (MSR) in the CPU executing the SMM. While the SMM is executed, system services and applications stop and cannot provide service, resulting in down time for the computer system. This also means the operating system has no way to know when the chipset signals an SMI and cannot capture the SMI data like data relating to other types of interrupts.

However, if a user desires to trace the source of the SMI and the interrupt type of the SMI in the operating system, the user must access the MSR. Unfortunately, the MSR is designed with a specific processor and is generally inaccessible. Ready access to data stored in the MSR requires use of a development tool provided by the processor chip vendor to dump the source and interrupt type data stored in the MSR.

Thus, currently, users cannot easily access data relating to SMIs because it is difficult to trace the source of SMI interrupt, which is triggered by firmware. Because the cause of certain SMIs is unknown, SMI data may assist in enhancing computer performance. Knowledge of the cause of SMIs prevents excessive downtime, as excessive interrupts result in executing the SMM for long periods of time, preventing processors from performing any other operations, thus reducing system performance.

Thus, there is a need for a system that allows data relating to system management interrupts to be made readily accessible. There is another need for a system that eliminates the need to access a special development tool to read SMI data from a processor register. There is also another need for a system that stores SMI data in an event log managed by the BMC to analyze the root causes of SMIs.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

One disclosed example is a computer system including a basic input output system (BIOS); a memory; and a central processing unit coupled to the memory and the BIOS. The central processing unit has a bootstrap processor executing a system management interrupt handler stored in the BIOS to trigger a system management interrupt (SMI) in a system management mode. The bootstrap processor executes the system management interrupt handler to store data relating to the system management interrupt in the memory.

A further implementation of the example system is an embodiment where the computer system includes a baseboard management controller (BMC) coupled to the memory. Another implementation is where the memory is a flash memory coupled to the BMC wherein the BMC stores the data to a system error log. Another implementation is where the data stored on the system error log is accessible via an Intelligent Platform Management Interface (IPMI) command. Another implementation is where the memory is a shared volatile memory. Another implementation is where the data in the memory is accessible via an operating system driver. Another implementation is where the computer system is a server. Another implementation is where the system includes a volatile memory and the memory is a non-volatile memory. The bootstrap processor determines a type of the SMI, and based on the type of SMI requiring a reboot, copies the data in the volatile memory to the non-volatile memory after a reboot of the central processing unit. Another implementation is where the central processing unit includes multiple processors including the bootstrap processor. Another implementation is where the system management interrupt is initiated by a hardware component signaling an input port of a south bridge chip of the central processing unit. Another implementation is where the system management interrupt is initiated from reliability-availability-serviceable (RAS) firmware on the central processing unit. Another implementation is where the system management interrupt is initiated from an operating system interfacing with a peripheral device. Another implementation is where the data is converted to a JavaScript Object Notation (JSON) format before being stored on the memory.

Another disclosed example is a method of storing data associated with a system management interrupt (SMI) in a computer system. Notification of a system management interrupt is received on a central processing unit. The central processing unit enters a system management mode. A system management handler of a basic input output system (BIOS) is executed by a bootstrap processor of the central processing unit. The system management interrupt is initiated via the bootstrap processor. The system management interrupt data is stored in a register of the bootstrap processor. The SMI data is converted to an accessible format. The converted SMI data is stored in a memory.

Another implementation of the example method is where the memory is a flash memory coupled to a baseboard management controller (BMC). The BMC stores the data to a system error log. Another implementation is where the method further includes allowing access to the SMI data stored on the memory via an operating system driver. Another implementation is where the method further includes determining whether a type of the system management interrupt requires a reboot. The memory is a non-volatile memory. The central processing unit is rebooted. The data in the memory is copied to a volatile shared memory after the reboot. Another implementation is where the system management interrupt is initiated by one of: a hardware component signaling an input port of a south bridge chip of the processor chipset; reliability-availability-serviceable (RAS) firmware; or an operating system interfacing with a peripheral device. Another implementation is where the data is converted to a JavaScript Object Notation (JSON) format.

Another disclosed example is a computer system including a basic input output system (BIOS); a volatile shared memory; a non-volatile memory; and a central processor unit coupled to the memories and the BIOS. The central processing unit has a bootstrap processor executing a system management interrupt handler stored in the BIOS to trigger a system management interrupt (SMI) in a system management mode. The bootstrap processor executes the system management interrupt handler to store data relating to the system management interrupt from a register of the bootstrap processor in either the volatile memory or the non-volatile memory based on whether a type of the SMI requires a reboot.

BRIEF DESCRIPTION OF THE DRAWINGS

The disclosure will be better understood from the following description of exemplary embodiments together with reference to the accompanying drawings, in which:

FIG. 3A is an example log entry for a hardware generated interrupt;

FIG. 3B is an example log entry for a software generated interrupt;

FIG. 4 is a table of data collected in a JSON format from the example routine;

Figure 1:
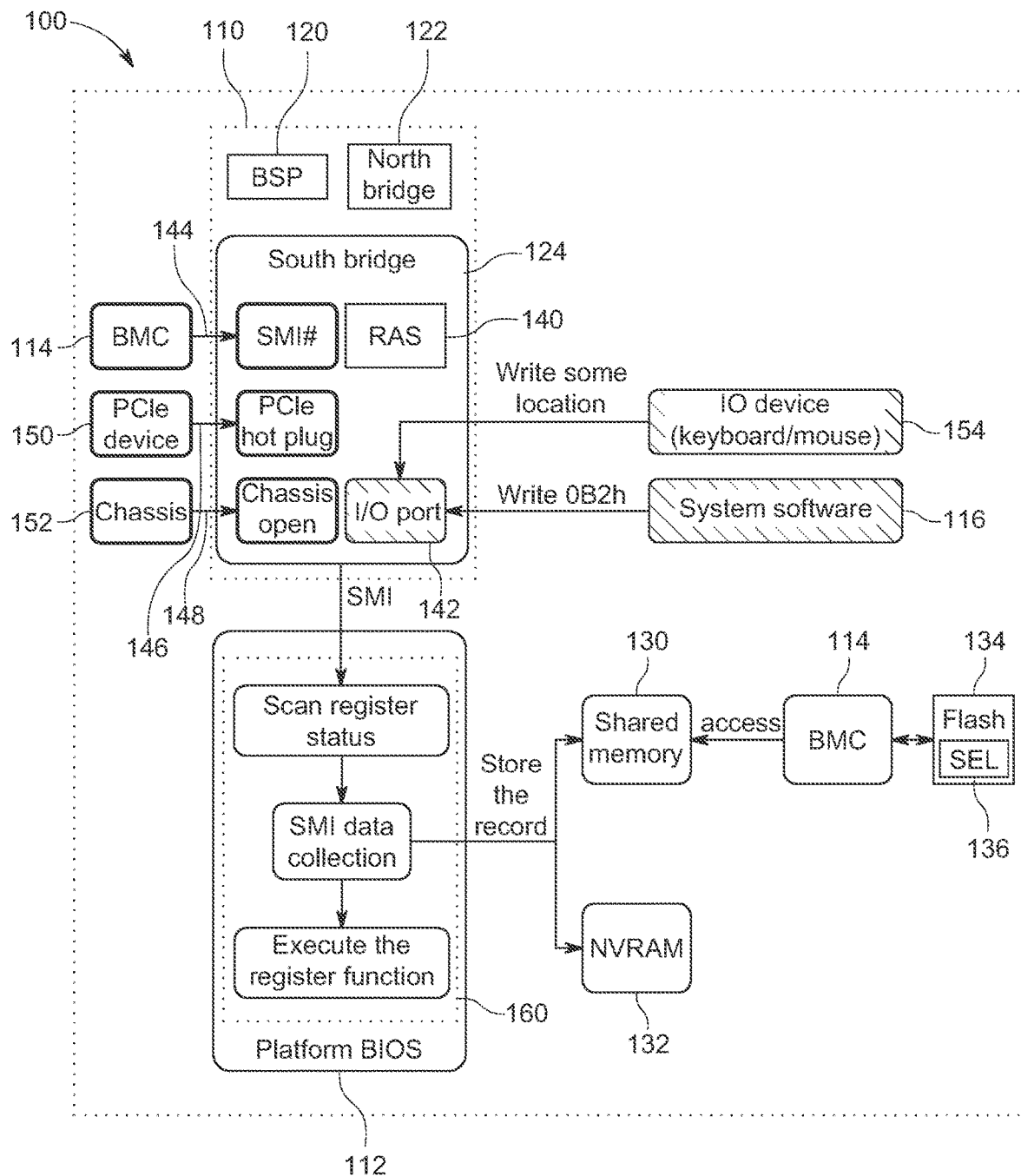
FIG. 1 is a block diagram of a computing system that includes firmware that allows logging of SMI data in an accessible location.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a routine that allowed collecting data associated with system management interrupts (SMI) and storing the data in an accessible format. The example routine is run with interrupt handler firmware and converts SMI data into an accessible format. The SMI data is stored in either shared memory or a non-volatile memory accessible by a controller such as a baseboard management controller (BMC). The disclosed example routine allows a user to easily trace the source of a system management interrupt (SMI), which is triggered by firmware. Ready access to the SMI data prevents performance drops of a computer system due to excessive SMIs. The routine also eliminates the need to obtain a specialized development tool to check a processor register for SMI data.

FIG. 1 is a block diagram of a computer system 100 that includes functionality for collection and accessible storage of SMI data. In this example, the computer system 100 is a server, but the principles disclosed herein may be incorporated in any computer system having an operating system using a system management mode (SMM) to handle SMIs. The computer system 100 includes a central processing unit (CPU) 110, a platform BIOS 112, a baseboard management controller (BMC) 114, and an operating system (OS) 116. The CPU 110 in this example is a chip set that may include a set of processing cores including a bootstrap processor (BSP) 120 as well as a north bridge chip 122, and a south bridge chip 124.

In this example, the north bridge chip 122 handles memory operations. The south bridge chip 124 performs basic input/output functions for the computer system 100. Another function of both the north bridge and south bridge chips 122 and 124 is to handle different reliability-availability-serviceable (RAS) features. The RAS features are designed to increase reliability, availability and facilitate service of peripheral components in the computer system 100. In this example, RAS features detect device errors in peripheral components such as add-on cards, dual in line memory modules (DIMM)s, and hard disk drives (HDD)s.

The computer system 100 includes a shared memory 130 that may be static random access memory (SRAM). The computer system 100 also includes a non-volatile memory 132, which may be a flash memory or a similar device. A dedicated BMC flash memory 134 stores BMC firmware, as well as a system error log (SEL) 136. In this example, the non-volatile memory 132 may be the same flash memory as the dedicated BMC flash memory 134. There may also be separate flash memories. The BMC 114 can access the BMC flash memory 134 to add entries in the SEL 136. An external device such as a management server in a datacenter may communicate via a network interface to the BMC 114 to read entries in the SEL 136. The BMC 114 can also access data written into the shared memory 130. In this example, the shared memory 130 is internal RAM on a BMC chip such as an AST2500 available from ASPEED, that is mapped to system memory.

In this example, the computer system 100 includes various hardware peripheral devices that access the input/output functions managed by the south bridge chip 124. The hardware peripheral devices in this example include peripheral component interface express (PCIe) devices, dual in line memory modules (DIMM), hard disk drives (HDD) or solid state drives (SDD), universal serial bus (USB) devices, serial peripheral interface (SPI) devices, and system management bus (SMBUS) devices. The PCIe devices may include expansion cards such as NICs (Network Interface Cards), redundant array of inexpensive disks (RAID) cards, field programmable gate array (FPGA) cards, solid state drive (SSD) cards, dual in-line memory devices, and graphic processing unit (GPU) cards. It is to be understood that there may be many such devices, and may include different types of devices from the devices described herein.

The south bridge chip 124 includes reliability-availability-serviceable (RAS) silicon 140 to manage error reports and other RAS functions. The south bridge chip 124 includes a set of input/output ports 142. The south bridge chip 124 also includes an SMI #port 144 that may be coupled to the BMC 114. The south bridge chip 124 also includes PCIe port 146 and a chassis open port 148. In this example, a PCIe device 150 may be coupled to the PCIe port 146 to request interrupts. It is to be understood that there may be multiple PCIe devices represented by the PCIe device 150. The chassis open port 148 may receive sensor interrupts such as a chassis open sensor 152 that requests an interrupt if the chassis of the computer system 100 is detected as open. The interrupts from the ports 144, 146, and 148 are hardware interrupts, as will be explained below. Other input/output devices 154 such as a keyboard, mouse, or video device may access the input/output ports 142. A specific input/output port (0B2h) may be accessed by the operating system 116 for generating software interrupts.

The platform BIOS 112 includes a system management interrupt (SMI) handler firmware 160. In this example, the SMI handler 160 processes system management interrupts. In this example, the SMI handler 160 is executed by the bootstrap processor 120 while the other processor cores are suspended from the entry into the SMM. The bootstrap processor 120 includes a series of model specific registers (MSR), including an MSR for storing SMI data.

As explained above, the System Management Mode (SMM) is an operating mode to perform system management operations by the BIOS 112 while the operating system (OS) 116 is running. During run time of the computer system 100, the chipset of the CPU 110 detects certain configured events. Such configured events may include notifications from processor cores, memory devices, peripheral devices, and other components that may trigger an interrupt. In this example, certain configured events signal an SMI. An SMI triggers the bootstrap processor 120 to enter the SMM by jumping to the SMM entry point. While entering SMM, all cores/threads also enter SMM mode until the bootstrap processor (BSP) 120 finishes the respective SMM service and exits the SMM.

In this example, there are three ways that the computer system 100 can enter the SMM. First, hardware on the motherboard or the processor chipset may signal an SMI notification via sending a signal to a designated pin (e.g., the SMI #input port 144) of the south bridge chip 124. This signal can be an independent event. Second, a software SMI may be triggered by the system software (e.g., Operating System 116) via an I/O access to a location considered special by the motherboard logic. For example, the input port 0B2h of the input ports 142, may be used as a special location for the I/O access. Third, an I/O write to a location may be received from an external device such as PCIe device. Firmware such as the BIOS 112 may receive the write and make a request for the processor chipset to trigger an SMI.

Examples of SMIs that are a result of hardware include thermal-sensor events, throttling activation, system management RAM access, a chassis open, system power button pressed, System Management Bus (SMBus) events, Power Management Events (PME), PCI Express (PCIe) Hot-Plug events, Real Time Clock (RTC) alarm activation, and various system-state-related activities. Examples of software initiated SMIs may be RAS events such as those used by a RAS tool to provide error injection based on an EINJ Advanced Configuration and Power Interface (ACPI) table. Another example of a software initiated SMI may be an application request, such as a BIOS application triggering a software SMI in the operating system.

Figure 2:
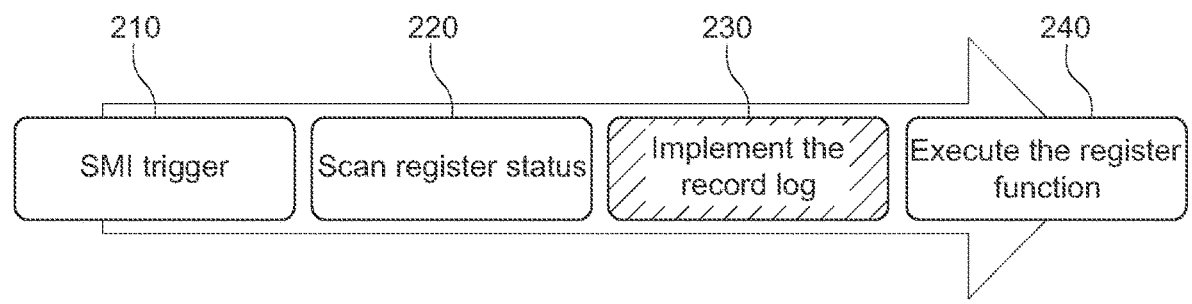
FIG. 2 is a process diagram showing the implementation of the logging function during the SMI.

FIG. 2 is a flow diagram of an example process of handling an SMI that includes collecting and storing the SMI data that is executed by the SMI handler 160 in FIG. 1. An initial SMI triggers the bootstrap processor 120 of the CPU 110 to enter the SMM (210). As explained above, the SMI may be triggered by a hardware device, via software such as the firmware of the BIOS 112, or from an external device through the operating system (OS) 116. When the operating system 116 is in SMM, the bootstrap processor 120 will scan the MSR register status to check the SMI source (220). The CPU 110 then executes the corresponding callback function. For example, if the power button is pushed, the function code in the SMM will write an IO port (e.g., 0xCF9) to turn off the system. Another example, may be the USB operating in legacy mode, where the function code in the SMM initializes the USB register. To collect data related to the SMI, the example routine allows a record log to obtain the SMI data (230). The processor then executes the appropriate function to address the SMI (240).

In the recording of the SMI data (220), the system firmware will check if the SMI data needs to be collected. In this example, the data related to each SMI is collected as fully as possible, unless such collection impacts the performance of the system 100 because the BIOS spends too much time in SMM. The BIOS setup options may include an option to disable to collection function to prevent excessive time in SMM. If there is a need to collect the SMI data, the SMI handler 160 will start to collect the data. In this example, the SMI handler 160 collects the SMI data and converts the SMI data to an accessible data format. In this example, the raw SMI data is converted to a JavaScript Object Notation (JSON) format for storage in an accessible memory. Other accessible data formats that are preferably an open standard file format and data exchange could be used.

After that, based on the SMI type, the SMI handler 160 will store the converted data in either volatilized (BMC-shared memory, e.g., RAM 130) or non-volatilized memory space (NVRAM, flash memory 132). In normal cases where the SMI type does not require a system reboot, the SMI handler 160 will store the SMI data in the shared memory 130 to let users retrieve data through an OS driver. Since the BMC 114 also may access the shared memory 130, the BMC 114 may retrieve the data and store it in the SEL 136 in the dedicated BMC flash memory 134.

In this example, the SMI types requiring a system reboot result in storing the converted SMI data in non-volatile memory to preserve the SMI data when the system reboots. For example, if the SMI is triggered by an uncorrectable error that may cause a system reboot or hang, system firmware will store data in the flash memory 132 to prevent data loss.

FIG. 3A shows a data record 310 of a hardware based SMI that may be stored in a system error log such as the system error log 136 in FIG. 1. The data record 310 includes the source, whether the interrupt was the last boot interrupt that occurred before the boot, the time of the interrupt, and the type of the interrupt. In this example, the interrupt occurred from an external hardware device (XHCI). A register associated with the identified external hardware device may be examined to determine why the SMI was triggered. Another example may be a USB device that writes a register bit corresponding to the error.

FIG. 3B shows a data record 320 of a software based SMI that may be stored in a system error log such as the system error log 136 in FIG. 1. The data record 320 includes the source, whether the interrupt was the last boot interrupt, the time of the interrupt, and the type of the interrupt. In this example, the interrupt was caused by an attempt to read the flash memory failing.

When data records such as the data records 310 or 320 are stored in the SEL 136, a user can use an Intelligent Platform Management Interface (IPMI) command to access the record directly through the BMC 114. For example, one set of records obtained via IPMI command may be:

1|07/01/2019|09:05:14|Software Management Interrupt|Hardware|PCI device HotPlug|Asserted 2|07/01/2019|09:05:14|Software Management Interrupt-|Software|Watchdog timer|

In this example, the first log entry notes that the SMI occurred from a PCI device, while the second log entry indicated that the interrupt occurred from a watchdog timer.

FIG. 4 shows a table 400 of JSON data formats that may be derived from the collected SMI data for SMI data relating to a particular interrupt. The table 400 includes an attribute column 410, a data type column 412, a read status column 414, and a description column 416. The attribute column 410 lists the applicable attribute derived from the SMI data. The data type column 412 shows the format of data (e.g., string or Boolean) of the attribute. The read/write column 414 indicates whether the data is read only. The description column 416 includes the description of the attribute.

The attributes row 420 includes a description of the source that determines whether the interrupt originated from a hardware or software source. The last boot interrupt attribute row 422 indicates whether the interrupt was triggered by the last boot. The timestamp attribute row 424 indicates the time of the interrupt. The type attribute row 426 indicates the type of the interrupt and is used to determine the component or the handler that triggered the SMI.

The SMI data allows identification of the source of the SMI. Identification of the source of the SMI, allows the BIOS to change the SMI handler to another interrupt handler which could not suspend the whole system to increase operational efficiency of the computer system 100. The SMI data may indicate a malfunctioning component. An operator may thus be alerted to repair or replace the component. The timestamp attribute of the SMI data may assist in tracing what application was executed and impacted the system. The lastbootinterrupt attribute of the SMI data may assist in tracking what kind of SMI may impact the system to cause a reboot.

Figure 5:
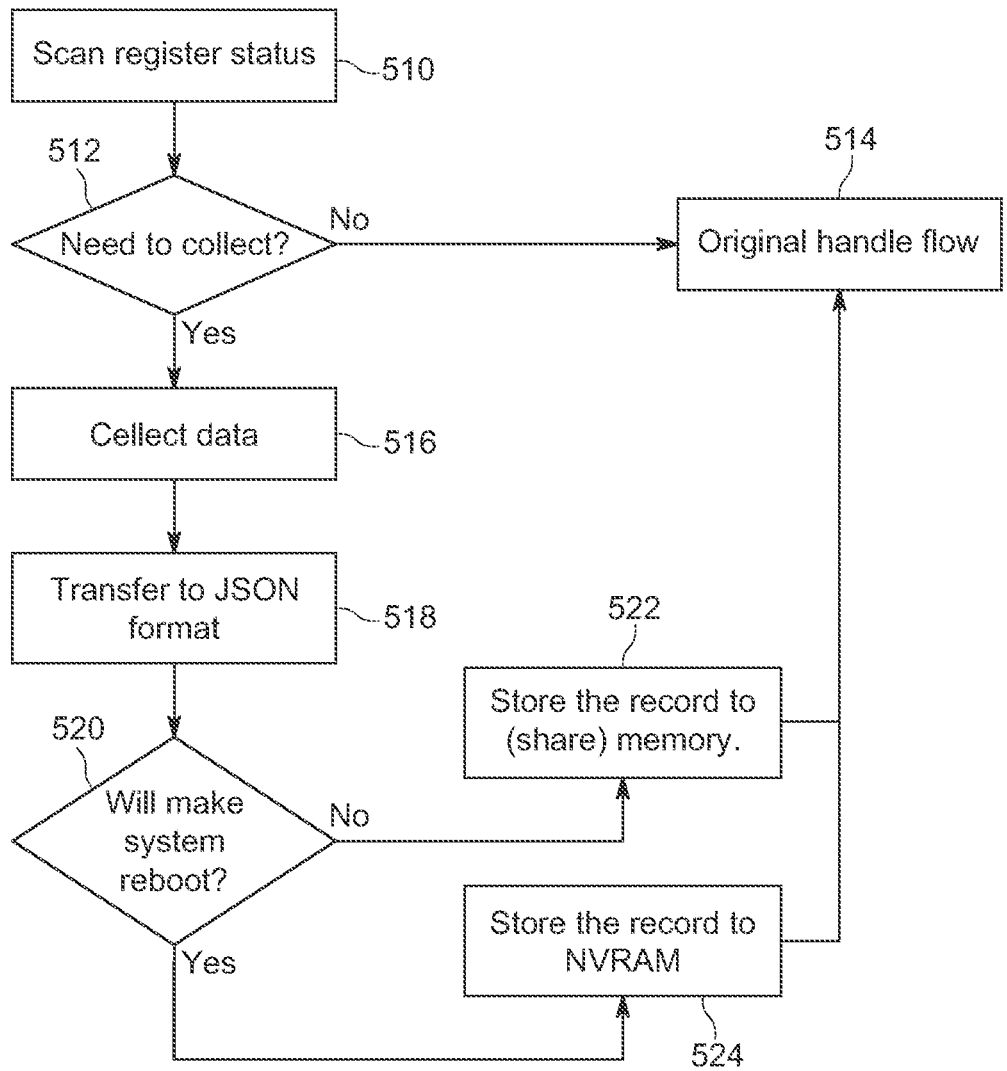
FIG. 5 is a flow diagram of an example routine for interrupting and collecting SMI data.

FIG. 5 shows a flow diagram of the example collection and storage process executed by the SMI handler 160. The routine first scans the MSR of the bootstrap processor 120 (510). The routine reads the SMI data stored in the MSR and determines whether the SMI data indicates the occurrence of an SMI, to determine whether to collect the data (512). If the routine determines that there is no need to collect the data (512), the routine returns to the original handler flow (514).

If the routine determines that data needs to be collected (512), the routine collects the SMI data from the MSR (516). The collected data is converted to the JSON format in this example (518). The routine reviews the type of SMI interrupt from the collected data. The routine decides whether the SMI interrupt requires a reboot (520). If the SMI interrupt does not require a reboot, the routine stores the record to shared volatile memory, such as the RAM 130 in FIG. 1 (522). The routine then loops to the original handler flow (514). If the SMI interrupt requires a reboot, the routine stores the record to non-volatile memory, such as the flash memory 132 in FIG. 1 (524). The routine then loops to the original handler flow (514).

Figure 6:
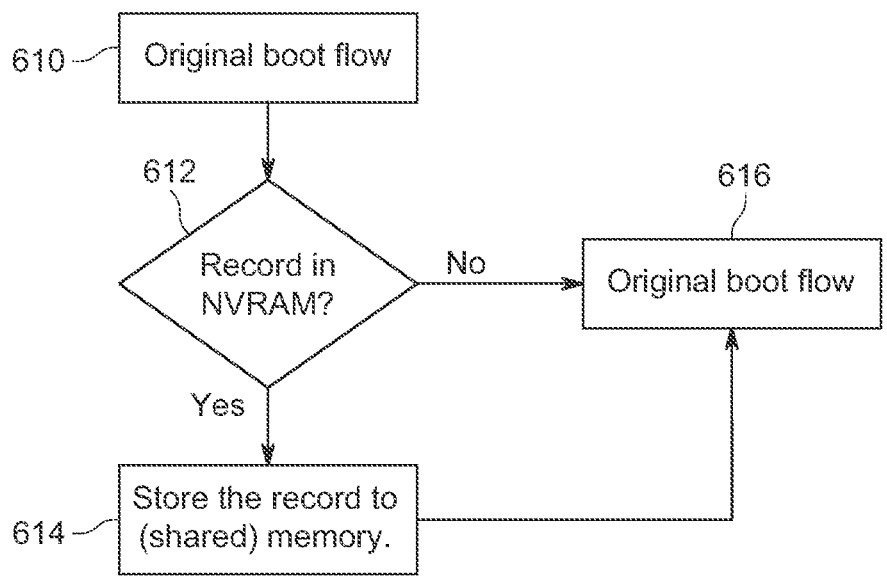
FIG. 6 is a flow diagram of an example routine for determining where to store SMI data after a reboot.

FIG. 6 shows the process of handling SMI data stored in NVRAM, such as the flash memory 132, after a reboot has occurred. The routine in FIG. 6 ensures that in BIOS POST time, the BIOS will check if any SMI data record is stored in NVRAM and then transfer it to the shared memory 130 to allow access to the SMI data. Thus, if the SMI interrupt results in a reboot, the SMI data will be accessible via the shared memory 130.

The routine begins with an original boot flow, such as the execution of the BIOS POST (610). The routine then determines whether an SMI data record is stored in the non-volatile memory (612). If there is SMI data stored in the non-volatile memory, the routine writes the data into the shared memory (614). The routine then loops to continue the original boot flow (616). If there is no SMI data stored in non-volatile memory, the routine continues to the original boot flow (616). In this manner, after a reboot, any SMI data previously stored in the non-volatile memory is now accessible via shared volatile memory.

The flow diagrams in FIGS. 5-6 are representative of example machine readable instructions for executing logging and storage of SMI data in the computer system 100 in FIG. 1. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 5-6, persons of ordinary skill in the art will readily appreciate that many other methods of implementing the example machine readable instructions may alternatively be used. For example, the order of execution of the blocks may be changed, and/or some of the blocks described may be changed, eliminated, or combined.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A computer system comprising:
   a basic input output system (BIOS);
   a memory; and
   a central processing unit coupled to the memory and the BIOS, the central processing unit including a bootstrap processor executing a system management interrupt handler stored in the BIOS to trigger a system management interrupt (SMI) in a system management mode, wherein the bootstrap processor executes the system management interrupt handler to convert the data to a JavaScript Object Notation (JSON) format and store JSON format data relating to the SMI in the memory, the data relating to the SMI including the source of the SMI.

2. The system of claim 1, further comprising a baseboard management controller (BMC) coupled to the memory.

3. The system of claim 2, wherein the memory is a flash memory coupled to the BMC wherein the BMC stores the data to a system error log.

4. The system of claim 3, wherein the data stored on the system error log is accessible via an Intelligent Platform Management Interface (IPMI) command.

5. The system of claim 1, wherein the memory is a shared volatile memory.

6. The system of claim 5, wherein the data in the memory is accessible via an operating system driver.

7. The system of claim 1, wherein the computer system is a server.

8. The system of claim 1, further comprising a volatile memory, wherein the memory is a non-volatile memory, wherein the bootstrap processor determines a type of the SMI, and based on the type of SMI requiring a reboot, copies the data in the volatile memory to the non-volatile memory after a reboot of the central processing unit.

9. The system of claim 1, wherein the central processing unit includes a plurality of processors, the plurality of processors including the bootstrap processor.

10. The system of claim 1, wherein the SMI is initiated by a hardware component signaling an input port of a south bridge chip of the central processing unit.

11. The system of claim 1, wherein the SMI is initiated from reliability-availability-serviceable (RAS) firmware on the central processing unit.

12. The system of claim 1, wherein the SMI is initiated from an operating system interfacing with a peripheral device.

13. A method of storing data associated with a system management interrupt (SMI) in a computer system, the method comprising:
- receiving notification of the SMI on a central processing unit;
- entering a system management mode;
- executing a system management handler of a basic input output system (BIOS) via a bootstrap processor of the central processing unit;
- initiating the SMI via the bootstrap processor;
- storing SMI data in a register of the bootstrap processor, wherein the data relating to the SMI includes the source of the SMI;
- converting the SMI data to a JavaScript Object Notation (JSON) format; and
- storing the converted SMI data in a memory.

14. The method of claim 13, wherein the memory is a flash memory coupled to a baseboard management controller (BMC), wherein the BMC stores the converted SMI data to a system error log.

15. The method of claim 13, further comprising allowing access to the converted SMI data stored on the memory via an operating system driver.

16. The method of claim 15, further comprising:
- determining whether a type of the SMI requires a reboot;
- rebooting the central processing unit, wherein the memory is a non-volatile memory; and
- copying the converted SMI data in the memory to a volatile shared memory after the reboot.

17. The method of claim 13, wherein the SMI is initiated by one of:
- a hardware component signaling an input port of a south bridge chip of the central processing unit;
- reliability-availability-serviceable (RAS) firmware; or
- an operating system interfacing with a peripheral device.

18. A computer system comprising:
- a basic input output system (BIOS);
- a volatile shared memory;
- a non-volatile memory; and
- a central processing unit coupled to the volatile shared memory, the non-volatile memory, and the BIOS, the central processing unit including a bootstrap processor executing a system management interrupt (SMI) handler stored in the BIOS to trigger a SMI in a system management mode,
wherein, based on whether a type of the SMI requires a reboot, the bootstrap processor executes the SMI handler to convert the data to a JavaScript Object Notation (JSON) format and store the JSON format data relating to the SMI from a register of the bootstrap processor in either the volatile memory or the non-volatile memory, wherein the data relating to the SMI includes the source of the SMI.

19. The system of claim 1, wherein the system management interrupt (SMI) is initiated from a hardware source different from the central processing unit or a software source and wherein the source of the SMI includes an identification of the hardware or software source initiating the SMI.

20. The method of claim 13, wherein the system management interrupt (SMI) is initiated from a hardware source different from a central processing unit or software source and wherein the source of the SMI includes an identification of the hardware or software source initiating the SMI.

* * * * *